United States Patent
Goldman et al.

(10) Patent No.: US 6,430,488 B1
(45) Date of Patent: Aug. 6, 2002

(54) VEHICLE CUSTOMIZATION, RESTRICTION, AND DATA LOGGING

(75) Inventors: Kenneth Alan Goldman, Norwalk, CT (US); Charles Campbell Palmer; Elaine Rivette Palmer, both of Goldens Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/058,599

(22) Filed: Apr. 10, 1998

(51) Int. Cl.[7] .............................. G06F 7/00; G06F 7/04; B60R 22/00; E05F 15/00
(52) U.S. Cl. ............................. 701/36; 701/1; 701/49; 701/45; 307/10.1; 307/9.1; 340/825.31
(58) Field of Search ............................. 701/36, 49, 1, 701/45; 340/825.31, 825.4; 307/10.1, 9.1; 303/57

(56) References Cited

U.S. PATENT DOCUMENTS 4,477,874 A * 10/1984 Ikuta ............................ 701/49
4,707,788 A 11/1987 Tashiro et al.

(List continued on next page.)

FOREIGN PATENT DOCUMENTS

| EP | 0178439 A2 | 4/1986 | |
|----|------------|--------|-|
| EP | 0345785 A2 | 12/1989 | |
| EP | 0770524 A1 | 5/1997 | |
| GB | 2090017 A | 6/1982 | |
| GB | 2273580 A | 6/1994 | |
| JP | 57090236 A | 6/1982 | ........... B60R/16/02 |
| JP | 57134349 A | 8/1982 | ........... B60R/16/02 |
| JP | 63041256 A | 2/1988 | ........... B60Q/3/02 |
| JP | 63041260 A | 2/1988 | ........... B06R/16/02 |
| JP | 63041261 A | 2/1988 | ........... B60R/16/02 |
| JP | 63041262 A | 2/1988 | ........... B60R/16/02 |
| JP | 63041263 A | 2/1988 | ........... B60R/16/02 |
| JP | 63053147 A | 3/1988 | ........... B60R/16/02 |
| JP | 63053148 A | 3/1988 | ........... B60R/16/02 |
| JP | 63-247141 | 10/1988 | |
| JP | 63247141 A | 10/1988 | ........... B60Q/1/00 |
| JP | 01114537 A | 5/1989 | ........... B60K/20/02 |
| JP | 01114555 A | 5/1989 | ........... B06R/16/02 |
| JP | 01114556 A | 5/1989 | ........... B60R/16/02 |
| JP | 01178047 A | 7/1989 | ........... B60R/16/02 |
| JP | 05075013 A | 3/1993 | ........... H01L/25/04 |
| JP | 06321028 A | 11/1994 | |
| JP | 06321028 A | * 11/1994 | |
| JP | 07240725 A | 9/1995 | ........... H04H/1/00 |
| JP | 07240726 A | 9/1995 | ........... H04H/1/00 |
| WO | WO84/03785 | 3/1984 | |
| WO | WO 98/30415 | 7/1998 | |

*Primary Examiner*—Jacques H. Louis-Jacques
*Assistant Examiner*—Brian J Broadhead
(74) *Attorney, Agent, or Firm*—Louis P. Herzberg

(57) ABSTRACT

A method, article of manufacture and computer product is presented for a vehicle customization, restriction, and data logging capability. The invention leverages the increasing electronic content in vehicles by interconnecting these electronic devices with a controller. It further uses a storage device in the vehicle, to store vehicle customizations and/or restrictions, and to provide capability for defining and logging significant vehicle events. Combining the electronic vehicle components with a storage device (sometimes in the form of a smart card or floppy disk, etc.) and a controller in a vehicle network enables providing operator specific settings for each of a set of vehicle operators. These customizations add to operator and passenger comfort and safety. It also enables application of setting restrictions to and logging the vehicles use parameters. These add previously unavailable tools to entities as diverse as a parent monitoring a teen driver, a company or government agency regulating a truck driver, an operator training facility, a vessel captain or pilot, a rental car company setting terms for a car rental and handling returns off line, and a car owner relinquishing the vehicle to a parking lot attendant.

13 Claims, 5 Drawing Sheets

U.S. PATENT DOCUMENTS

| | | | | |
|---|---|---|---|---|
| 4,835,970 A | * | 6/1989 | Shimamura et al. | 60/545 |
| 5,091,856 A | * | 2/1992 | Hasegawa | 701/36 |
| 5,124,920 A | * | 6/1992 | Tamada et al. | 701/36 |
| 5,247,440 A | * | 9/1993 | Capurka et al. | 701/49 |
| 5,289,369 A | * | 2/1994 | Hirshberg | 705/13 |
| 5,303,163 A | * | 4/1994 | Ebaugh | 701/274 |
| 5,379,219 A | * | 1/1995 | Ishibashi | 701/35 |
| 5,446,659 A | * | 8/1995 | Yamawaki | 701/29 |
| 5,504,482 A | * | 4/1996 | Schreder | 340/995 |
| 5,513,107 A | * | 4/1996 | Gormley | 701/48 |
| 5,532,690 A | * | 7/1996 | Hertel | 340/989 |
| 5,581,464 A | * | 12/1996 | Woll et al. | 701/35 |
| 5,608,629 A | * | 3/1997 | Cuddiby et al. | 701/1 |
| 5,680,328 A | * | 10/1997 | Skorupski et al. | 701/35 |
| 5,812,070 A | * | 9/1998 | Tagami et al. | 340/932.2 |
| 5,877,707 A | * | 3/1999 | Kowalick | 340/988 |
| 5,938,716 A | * | 8/1999 | Shutty et al. | 701/115 |
| 5,948,026 A | * | 9/1999 | Beemer et al. | 701/35 |
| 5,969,598 A | * | 10/1999 | Kimura | 340/436 |
| 6,006,148 A | * | 12/1999 | Strong | 701/33 |
| 6,076,026 A | * | 1/2000 | Jambhekar et al. | 701/35 |
| 6,122,580 A | * | 9/2000 | Autermann | 701/49 |
| 6,173,231 B1 | * | 1/2001 | Chojnacki | 701/208 |
| 6,232,874 B1 | * | 5/2001 | Murphy | 340/426 |
| 6,256,565 B1 | * | 7/2001 | Yanagi et al. | 701/45 |
| 6,275,231 B1 | * | 8/2001 | Obradovich | 345/349 |
| 6,278,928 B1 | * | 9/2001 | Aruga et al. | 701/65 |

* cited by examiner

USD = Unrestricted Storage Device
RSD = Restricted Storage Device

VEHICLE CUSTOMIZATION, RESTRICTION, AND DATA LOGGING

FIELD OF THE INVENTION

The present invention is directed to the field of electronic control, and more specifically directed to vehicular electronic control.

BACKGROUND OF THE INVENTION

When several people share the operating responsibilities of a vehicle, each particular operator needs to customize various settings, such as the angle of the mirrors and the position of the driver's seat. When another operator wants to operate the vehicle, he or she must reposition and reset all those customized features. Resetting all the devices in a complex vehicle can take time, and if not done correctly, such as the positioning of the mirrors, can result in accidents. Besides settings and preferences, restrictions may be imposed on certain operators of vehicles. For example a commercial truck driver may be authorized to drive no more than a limited number of hours per day. Often, there is presently no easy way to enforce these restrictions until after they have been violated, and quite often, there is no way to determine if the restrictions have been violated at all.

Presently, vehicle device settings are generally changed manually. These settings include vehicle mirrors, temperature settings, radio station preferences, seat positions, and so on. Even if the devices changed are driven by electric motors, the driver or operator of the vehicle sets each of them to his or her preference.

When restrictions are imposed on a vehicle operator, most often they are enforced by other people, such as law enforcement officers and parents. In the case of convicted drunk drivers, some vehicles may be equipped with a breathalyser machine which does not allow the driver to move the car without first passing a breath test for alcohol.

While devices in a vehicle are being transformed from mechanical to electronic control, many devices combine mechanical operation with increasing electronic content. There is presently little or no communication between the devices and/or the specific allocation of a device to satisfy requirements/desires of a particular operator. In some cases, vehicle communication considerations are generally and primarily employed to reduce the weight and cost of point to point wiring harnesses.

SUMMARY OF THE INVENTION

The invention leverages the increasing electronic content in modern vehicles by connecting these electronic devices. These electronic devices are herein referred to also as electronic islands connected to a controller. It further uses a storage device in the vehicle, to store vehicle customizations and/or restrictions, and to provide capability for defining and logging significant vehicle events. Combining the electronic vehicle components with a storage device and a controller in a vehicle network enables providing operator specific settings for each of a set of vehicle operators.

These customizations add to operator and passenger comfort and safety. They also enable application of setting restrictions to and log the vehicle's use parameters. These add previously unavailable tools to entities as diverse as a parent monitoring a teen driver, a company or government agency regulating a truck driver, vessel captain or pilot, a vehicle training facility, a rental car company setting terms for a car rental and handling returns off line, and a car owner relinquishing the vehicle to a parking lot attendant.

An aspect of the invention is to provide a method for controlling vehicle settings. The method comprises providing a list of customization settings for at least a first user, reading a first portion of information from the list, and writing a third portion of information from information obtained in the step of reading to at least one functional device in the vehicle.

In an embodiment the method further comprises the functional device(s) responding to the second portion of information; and/or the step of providing is comprised of the first user of the vehicle manually setting at least one functional device setting according to a desire, and saving the manual settings; and/or the step of providing includes providing a storage device for the first user; and/or the step of reading includes reading a second portion of information from the storage device; and/or the step of responding includes the functional device becoming enabled in a state in accordance with the information; and/or the step of providing is comprised of retrieving a particular user settings record from a storage system, and saving the retrieved user settings record in the storage device; and/or the customization settings customize the vehicle to at least one specification provided by the first user; and/or wherein the customization settings customize the vehicle to at least one other occupant; and/or the customization settings include restrictions to the use of the vehicle; and/or the storage device is portable and/or contactless; and/or the storage device conforms to an international standard and/or the functional device(s) includes a power seat positioner and/or the step of responding comprises optimizing deployment of an air bag in the vehicle according to the height of at least one occupant of the vehicle; and/or a vehicle authority is a rental agency or a vehicle insurance company agent; and/or the method further comprising inserting the storage device into a vehicle door; and/or the step of reading the third portion of information is performed by reading the storage device when inserted into a vehicle door; and/or the step of inserting unlocks the vehicle door; and/or reading a current state of at least one functional device into a controller; and/or writing the current state to the storage device.

Another aspect of the invention is the provision of a method for controlling settings of at least one functional device in a vehicle. The method comprising: reading a current state of at least one functional device into a controller, writing information from the controller to at least one functional device, and the at least one functional device responding to the information.

In an embodiment of the method, the functional device(s) includes a clock and a global positioning system supplying time of day and date information; and/or the functional device includes a speedometer and a global positioning system supplying speed limit information, and a vehicle cruise control system which automatically controls an operating speed of the vehicle.

Still another aspect of the invention is the provision of an apparatus for controlling settings of a plurality of functional devices in a vehicle. The apparatus comprising: an acceptance device for accepting a plurality of user settings for a vehicle user, and a controller to forward the user settings from the acceptance device to at least one of the functional devices in the vehicle.

In an embodiment, the apparatus further comprises a storage device having a list of a first subset of settings for the user and/or the controller is enabled to read at least one current setting from at least one of the functional devices; and/or a device enabler to enable functional devices to respond to the user settings, and/or the enabler includes an ignition switch; and/or an input device capable of receiving a subset of user settings entered manually, and/or wherein a first entry in the second subset is construed to override a second entry in the first subset; and/or the acceptance device is located on a vehicle door; and/or the acceptance device is capable of receiving wireless communication signals from a storage device.

Another aspect of the invention is the provision of an apparatus for recording settings of a plurality of functional devices in a vehicle. In an embodiment, the apparatus comprises a monitor for monitoring to read at least one state setting of each of at least one of the functional devices, the at least one of the functional devices being capable of making available the at least one state to the device monitor, means for accepting to receive information from the device monitor, and means for storing to store the information received by the means for accepting.

In an embodiment, the apparatus further comprising wiring harness means to substantially interconnect the device monitor, the means for accepting, and the functional devices.

Another aspect of the present invention is to provide an article of manufacture comprising a computer usable medium having computer readable program code means embodied therein for controlling vehicle settings, the computer readable program code means in the article of manufacture comprising a computer readable program code means for causing a computer to effect the steps of providing a list of customization settings for at least a first user, reading a first portion of information from the list, and writing a second portion of information from information obtained in the step of reading to at least one functional device in the vehicle.

In an embodiment, the computer readable program code means in the article of manufacture further comprises a computer readable program code means for causing a computer to effect the at least one functional device responding to the second portion of information; and/or the step of providing is comprised of the first user of the vehicle manually setting at least one functional device setting according to a desire, and saving the manual settings; and/or the step of providing includes providing a storage device for the first user; and/or the step of reading includes reading a second portion of information from the storage device; and/or the step of responding includes enabling the functional device in a state in accordance with the information; and/or the step of providing is comprised of retrieving a particular user settings record from a storage system, and saving the retrieved user settings record in the storage device; and/or the customization settings include restrictions to the use of the vehicle.

Another aspect of the present invention is to provide a computer program product comprising a computer usable medium having computer readable program code means embodied therein for controlling settings of at least one functional device in a vehicle. The computer readable program code means in the computer program product comprising computer readable program code means for causing a computer to effect: reading a current state of at least one functional device into a controller, and writing information from the controller to at least one functional device.

In an embodiment, the computer readable program code means in the computer program product further comprising computer readable program code means for causing a computer to effect, the functional device responding to the information; and/or the functional device includes a clock and a global positioning system supplying time of day and date information; and/or the at least one functional device includes a suspension controller for controlling the suspension of the vehicle; and/or the step of responding comprises setting performance and comfort variations for the suspension.

Still another aspect of the present invention is to provide a program storage device readable by machine, tangibly embodying a program of instructions executable by the machine to perform method steps for controlling vehicle settings. The method comprising providing a list of customization settings for at least a first user, reading a first portion of information from the list, and writing a second portion of information from information obtained in the step of reading to at least one functional device in the vehicle.

In an embodiment, the method steps further comprises the functional device responding to the second portion of information; and/or the step of providing includes providing a storage device for the first user; and/or the step of responding includes the functional device becoming enabled in a state in accordance with the second portion of information.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Figure 1:
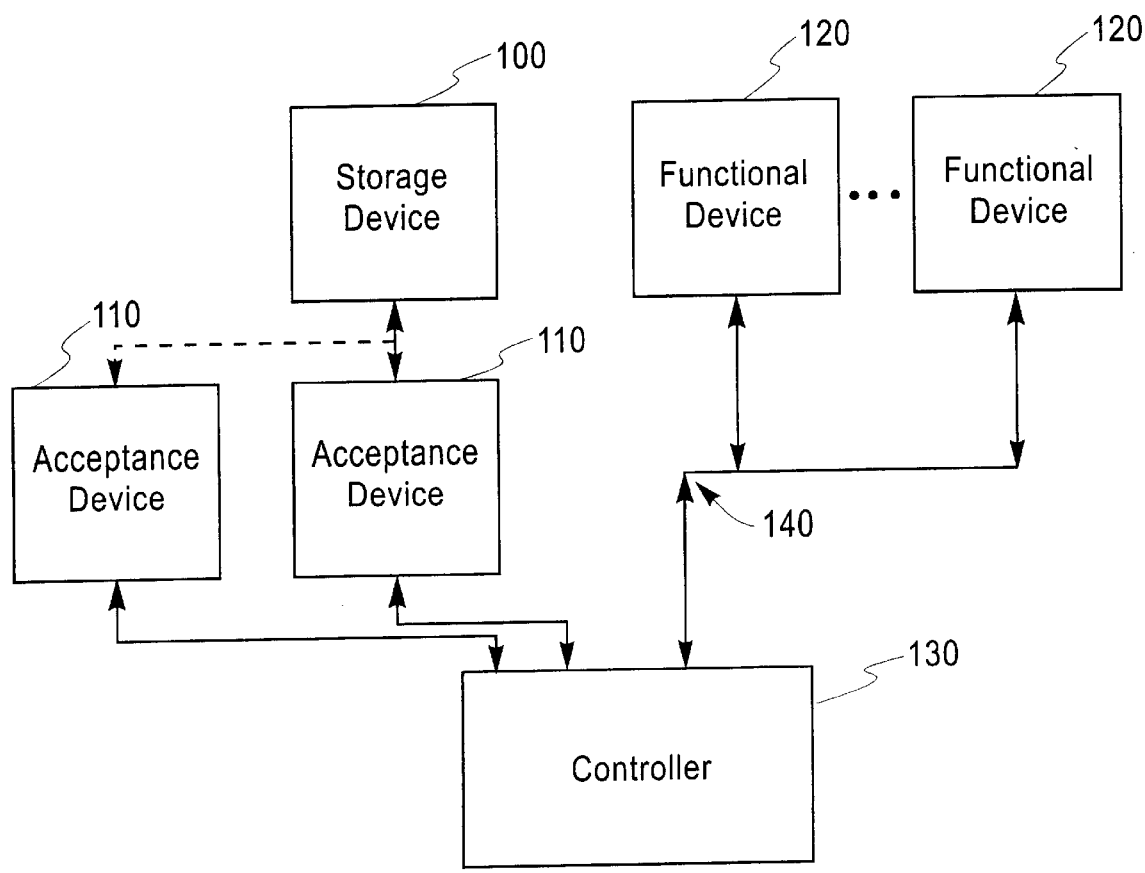
FIG. 1 is an exemplary apparatus for controlling and logging vehicle settings in accordance with the present invention.

FIG. 1 shows an apparatus for controlling and logging vehicle settings specific to each vehicle operator. In an embodiment, the apparatus has a storage device 100. In an embodiment, the storage device 100 is incorporated in a portable data carrying unit such as a smart card. Smart cards meeting international standard ISO 7816, or ISO 10536, are well known in the state of the art. Alternate embodiments may employ other configurations such as one or more computer diskettes and/or a personal digital assistant, etc.

In the exemplary embodiment of FIG. 1, the acceptance device 110 is a smart card reader capable of communicating with the smart card. Such acceptance devices are well known in the state of the art, typically being provided by the smart card manufacturer. Alternate storage devices also have well known corresponding acceptance devices.

As shown in FIG. 1, there may optionally be more than one acceptance device 110. For example, there may be one or more acceptance devices 110 mounted outside the vehicle to which the apparatus applies, and one or more acceptance devices 110 mounted inside the vehicle. In an embodiment, the acceptance device is a vehicle entry lock on a front door. The apparatus further includes a functional device 120. The functional device 120 is a vehicle component capable of being read and/or controlled via electronic means. Such vehicle components include but are not limited to drive components, safety components and general purpose components. The drive components include components such as an engine controller, transmission controller, suspension controller, power steering controller, brake controller, cruise control, or speedometer, etc. The safety components include components such as seat belt sensors, air bag deployment controller, and/or seat occupancy sensor, etc. The general purpose components include components such as a radio, temperature controller, steering wheel tilt control, remote mirrors, door, hood, glove box, and trunk locks, global positioning system, clock, a keypad used for keyless entry, or a keypad used for an acuity test or user verification.

The apparatus also includes a controller 130.

The controller 130 is often a rugged but inexpensive stored program microcontroller. Such controllers are well known to those familiar in the art. A connection 140 between the functional devices and the controller may be implemented for example as a bus. In some cases it apparatus may employ a bus which meets the requirements of the ISO 11898 Controller Area Network (CAN). CAN is generally a means of reducing the size and weight of a vehicle wiring harness. In an alternate embodiment, the acceptance device 110 is also connected to the bus. In an alternate embodiment of the connection 140, a bus is not used and all devices are connected to the controller through private wiring. Combinations of a bus architecture and private wiring to optimize performance and cost may also be employed.

In this invention, the concept of electronic control of vehicle functions can be combined with that of a controller to provide new functions.

Figure 2:
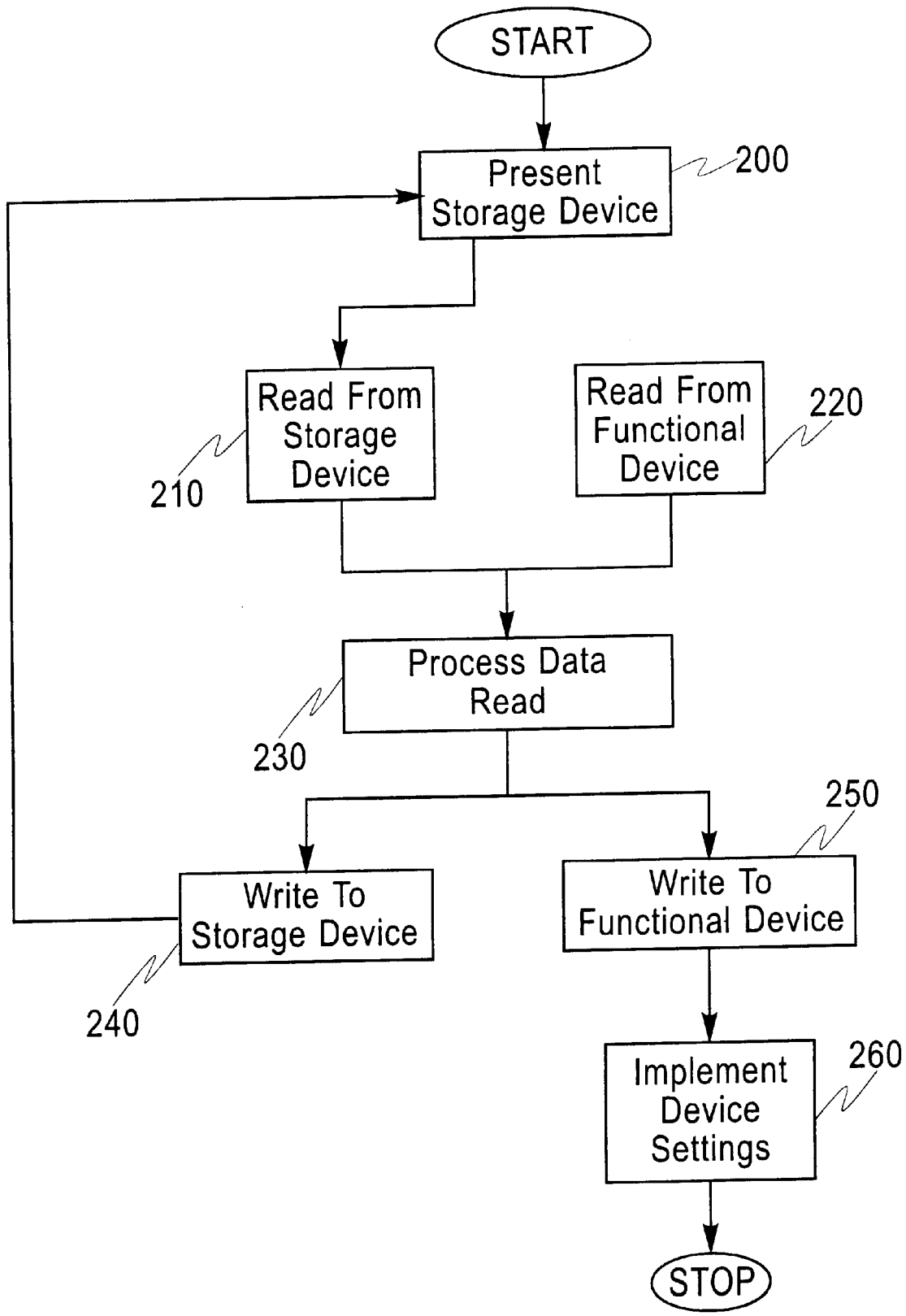
FIG. 2 is a flow chart for a general method of controlling or logging vehicle settings in accordance with the present invention.

FIG. 2 is a flow chart for a general method of controlling or logging vehicle settings. In step 200, the storage device 100 is presented to a storage device acceptance unit 110 when required by the functional application. It is assumed that the storage device 100 already has the device settings specific to the particular vehicle operator. If not, the operator may manually or semi-automatically position the functional devices to that operators desired/required settings. This settings are monitored and loaded into the storage device for continued use until modified by that operator and/or an operator surrogate/manager. In step 210, the storage device 100 is read by the controller 130 using the storage device acceptance unit 110. In step 220, one or more functional devices 120 are read by the controller 130. Data from the storage device 100 (if any) and one or more functional devices 120 are combined and processed in step 230.

Depending upon the particular function application steps 200, 210 and 220 are optional and may or may not be present. However at least one of steps 200 and 210 or step 220 must be present so that input data is available to the controller 130 for use in step 230.

In step 240, processed data is written from the controller 130 to the storage device 100 through the storage device acceptance unit 110. The updated data becomes available the next time the storage device is presented in step 200. In step 250, the resulting processed data is written from the controller 130 to one or more functional devices 120. In step 260 the new device settings are implemented by the device.

Steps 240, 250 and 260 are optional and may or may not be present. However, at least one of step 240 or 250 must be present to complete an operation. Step 260 may in some cases only be performed when the vehicle ignition is turned on.

In an embodiment of step 210, the read data is a vehicle operator specific customization data. The customization data may include specific operator device settings for comfort, performance, and/or safety.

In an instance of the embodiment used for keyless vehicle entry, the vehicle operator or user causes the presentation of the storage device 100 (step 200) into an acceptance device 110 in the vehicle door. The controller 130 reads (step 210) from the storage device 100, verifies (step 230) the storage device 100 and activates (step 250) a functional device 120 to unlock the door. In an alternate embodiment, a functional device 120 implementing a keypad is further read (step 220) by the controller 130 to verify (step 230) the holder of the storage device 100.

In another instance of the embodiment used for customizing seat positioning, the user inserts (step 200) the storage device 100 into an acceptance device 110. The controller 130 reads (step 210) from the storage device 100, translates (step 230) seat position distances and tilt into commands to a functional device 120 implementing a power seat positioner, writes (step 250) to the seat positioner and causes the seat to be positioned (step 260) at the specific user settings (step 260).

In another instance of the embodiment used for customizing steering wheel positioning, the user inserts (step 200) the storage device 100 into an acceptance device 110. The controller 130 reads (step 210) from the storage device 100, translates (step 230) steering wheel distance and tilt into commands to a functional device 120 implementing a steering wheel positioner, writes (step 250) to the positioner and causes the steering wheel to be positioned at the settings for the particular user (step 260).

In still another instance of the embodiment used for customizing mirror positioning, the user inserts or presents the storage device 100 (step 200) into an acceptance device 110. The controller 130 reads (step 210) the storage device 100, translates (step 230) the mirror angles into commands to a functional device 120 implementing a mirror positioner, and writes (step 250) the positioner.

In still another instance, the embodiment is used for customizing radio station buttons. In this case the user inserts (step 200) the storage device 100 into an acceptance device 110. The controller 130 reads (step 210) from the storage device 100, translates (step 230) radio station band and frequency data into commands to a functional device 120 implementing a radio, and writes (step 250) to the radio.

In an alternate embodiment for customizing radio station buttons, the storage device 100 holds preprogrammed station type preference data such as news, or classical or country music. The controller 130 also reads (step 220) a functional device 120 implementing a global positioning system (GPS). The GPS device 120 has radio station classification information in its data base. The controller 130 combines (step 230) radio station classification, band and frequency data from the functional device 120 and preferences from the storage device 100, into commands to a functional device 120 implementing a radio, and writes (step 250) to the radio. This also permits the radio to be reprogrammed as the vehicle movement from one area to another is sensed by the GPS. In a further embodiment this permits the radio to be programmed for a rental car even in an unfamiliar area.

In another instance of the embodiment used for customizing temperature settings, the user inserts the storage device 100 (step 200) into an acceptance device 110. The controller 130 reads (step 210) from the storage device 100, translates (step 230) temperature settings into commands to a functional device 120 implementing a heating, ventilation, and air conditioning controller, and writes (step 250) to the controller.

In another instance of the embodiment used for customizing an air bag deployment profile. In this case, the user may present (step 200) the storage device 100 into an acceptance device 110. The controller 130 reads (step 210) from the storage device 100, translates (step 230) user physical characteristics such as height into commands to a functional device 120 implementing an air bag deployment controller, and writes (step 250) to the controller.

In another alternate embodiment, a functional device 120 implementing a keypad is further read (step 220) by the controller 130 (step 200) to verify (step 230) the holder of the storage device 100 before modifying the air bag deployment profile.

In still another alternate embodiment, a functional device 120 implementing a seat belt use indicator, and/or a functional device 120 implementing a vehicle speed indicator, and/or a functional device 120 implementing seat position indicator, and/or a functional device 120 implementing steering wheel position indicator, and/or a functional device 120 implementing seat occupied indicator is further read (step 220) by the controller 130 before modifying the air bag deployment profile.

In still another instance, the embodiment is used for customizing vehicle performance such as fuel economy versus responsiveness. In this case, the user may insert (step 200) the storage device 100 into an acceptance device 110. The controller 130 reads (step 210) from the storage device 100, translates (step 230) performance settings into commands to a functional device 120 implementing an engine and/or automatic transmission controller, and writes (step 250) the controller.

In another instance of the embodiment used for customizing vehicle performance such as ride handling versus comfort. Here, the user may present (step 200) the storage device 100 into an acceptance device 110. The controller 130 reads (step 210) from the storage device 100, translates (step 230) performance settings into commands to a functional device 120 implementing a suspension controller or power steering controller, and writes (step 250) to the controller.

In another instance of the embodiment used for customizing vehicle performance such as brake pedal sensitivity, the user inserts (step 200) the storage device 100 into an acceptance device 110. The controller 130 reads (step 210) from the storage device 100, translates (step 230) performance settings into commands to a functional device 120 implementing a power brake controller, and writes (step 250) to the controller.

In another instance, the embodiment is used for customizing vehicle destinations. In this case, the user may insert (step 200) the storage device 100 into an acceptance device 110. The controller 130 reads (step 210) from the storage device 100, translates (step 230) destinations into commands to a functional device 120 implementing a global positioning system controller, and writes (step 250) the controller.

In another instance of the embodiment used for customizing vehicle speed of operation, the user inserts (step 200) the storage device 100 into an acceptance device 110. The controller 130 reads (step 210) the storage device 100, the data read (step 210) being desired vehicle speed relative to the speed limit. The controller 130 also reads (step 220) from a functional device 120 implementing a global positioning system, the device 120 having in its data base speed limit information for all and/or major roads. The data read (step 220) may include speed limit data for the current vehicle position. The controller 130 translates (step 230) the read data (step 210) and (step 220) processes them(step 230) into commands to a functional device 120 implementing a cruise control, and writes (step 250) to the cruise control.

In an alternate embodiment, a warning is issued if the speed limit relative to the read data (step 210) and (step 220) is exceeded for more than a desired specified and/or pre-programmed time. In another alternate embodiment, the speed can also be adapted to anticipate curves and intersections. This may use a GPS device and/or a scene monitoring and reporting device.

In an alternate preferred embodiment, the controller 130 reads (step 220) from functional devices 120 and writes (step 250) to functional devices 120.

In one instance of the embodiment, the global positioning system provides time of day information, which can be reformatted and written to the vehicle clock. Such a method may also be employed to automatically adjust for time zone. Alternatively, the time of day can be retrieved from a broadcast via the radio. In another instance of the embodiment, the global positioning system can detect a change in road type and warn the user or disengage the cruise control.

It will be apparent to those skilled in the art that the present invention may be used to read and employ data containing other user customizations for comfort, performance, or safety not described here. Additional communication among functional devices through the controller may also be implemented.

In still another alternate preferred embodiment, the read data (step 210) indicates to the controller 130 that a user restriction is in effect. In an alternate embodiment, the read data (step 210) may include an indication to the controller 130 that operational data from functional devices (step 220) should be logged (step 240) to the storage device 100.

An example embodiment of a storage device 100 used to hold restriction data or logged data is a tamper resistant and copy resistant device. An example of such a storage device 100 is a smart card having these enhanced capabilities.

In one instance, the embodiment may be used to limit driving time for a truck driver. The driver and/or managing user presents (step 200) the storage device 100 (step 200) into an acceptance device 110. The controller 130 reads (step 210) the storage device 100, and determines the driving time allowed per 24 hour period. The controller 130 reads (step 220) functional devices 120 such as the engine controller to determine whether the engine is running, and/or the transmission controller or speed indicator to distinguish cruising time from idling time, idling time may be such as when the ignition is running for heating purposes while the driver is stopped at an overnight rest stop. The time of day read (step 220) from a functional device 120 such as the clock and duration of operation of the vehicle are logged (step 240) to the storage device 100.

In an alternate preferred embodiment, driving time violations are logged (step 240) to the storage device 100. If the driver attempts to restart the truck to drive it, the driver can be refused a right to operate the vehicle. Such refusal may be allowed to be overridden. The trucking company or government authority can check the driver's storage device 100 at periodic intervals for violations. This may be able to be performed remotely and/or periodically via a communications link connecting the vehicle and company and/or authority.

Another instance of the embodiment may be used to limit driving hours. For example, drivers with such restrictions may be able to drive only during daylight hours. The user inserts the storage device 100 (step 200) into an acceptance device 110. The controller 130 reads (step 210) from the storage device 100, and determines the permitted driving hours. The controller 130 reads (step 220) the time of day from a functional device 120 such as the clock, and driving times are logged (step 240) to the storage device 100.

In an alternate embodiment, driving time violations may be logged (step 240). In another alternate embodiment, the driver's request to drive may be rejected during a prohibited time. In an alternate embodiment, the refusal can be overridden. The driver's storage device 100 may read at periodic intervals for violations at rest stations interconnecting with an authority via a telephone connection to the apparatus.

In an alternate preferred embodiment, the time of day is read (step 220) from a tamper resistant functional device 120 such as a global positioning system. Such a functional device 120 can also provide latitude and longitude data as well, permitting a restriction relative to daylight hours rather than an absolute time.

Another instance of the embodiment is used to implement an expiration date and time. For example, a card given to a parking attendant may be caused to become worthless after a period of time, for example after one day. The user inserts the storage device 100 (step 200) from into an acceptance device 110. The controller 130 reads (step 210) the storage device 100, and determines the expiration date and time. The controller 130 reads (step 220) the time of day from a functional device 120 such as the clock, decides whether to allow access and/or operation of the vehicle.

Another instance of the embodiment is used to restrict driving location and/or log geographic information. For example, a driver with a substance abuse conviction may have specific restrictions. For example, the driver may be restricted to driving only between home and work. Similarly, a child may be restricted to the route between home and school. A rental car may have particular restrictions of the use of the vehicle. For example, the vehicle may be restricted relative to a particular boundary. This may include a prohibition from leaving the country of rental. A car given to a valet for parking, or a mechanic for repair, may be restricted to operate for a maximum distance from the point where the vehicle is transferred. The user inserts the storage device 100 (step 200) into an acceptance device 110. The controller 130 reads (step 210) from the storage device 100, and determines the permitted driving locations. The controller 130 reads (step 220) the location from a functional device 120 such as a global positioning system, and destinations and/or routes are logged (step 240) to the storage device 100.

In an alternate embodiment, location violations are logged (step 240). In another alternate embodiment, the driver may be restricted and/or can be rejected from entering a prohibited location. In another alternate embodiment, the refusal may be overridden and the override may be logged (step 240). The driver's storage device 100 may be read at periodic intervals or various locations to determine the existence of violations and/or their severity.

In an alternate preferred embodiment of the previously described application for customizing vehicle speed of operation, speed limit violations may be logged (step 240) to the storage device 100. The driver's storage device 100 may be read at progressive locations along a prescribed route and/or at periodic intervals for violations.

Another instance of the embodiment is used to limit and/or monitor access to locked areas. For example, temporary drivers such as a parking attendant or car wash employee with such restrictions may be able to drive the car, but be denied access to the glove box and/or the trunk and/or the engine compartment, listen to radio or watch a television set in the vehicle. This can be alone for example, wherein the user may present the storage device 100 (step 200) into an acceptance device 110. The controller 130 reads (step 210) from the storage device 100, and determines the access permission. The controller 130 may be made to refuse to unlock a locked area and/or disable functionality of a device for which permission is denied.

Still another instance of the embodiment uses the storage device 100 in a manner similar to the blackbox on an airplane. The controller 130 reads (step 200) a functional device 120 such as an air bag deployment controller which is used to sense a vehicle collision. Upon detecting an event indication for an event such as a collision, the controller reads (step 220) from a plurality of functional devices 120 such as speed, throttle, and brake status, headlight, wiper, and turn signal status, seat occupied indicators, and location and/or direction of travel data from the global positioning system. In some embodiments, equipment advances in positioning may allow lane position to be retrieved as well. In alternate embodiments, for example, situations controlled by time constraints, a subset of the information (for example, headlight status) may be read (step 220) at periodic intervals. This may be stored temporarily in the controller 130 to reduce the amount of information read (step 220) from functional devices 120 after a collision is detected. The controller 130 may write (step 240) the status information to the storage device 100. In cases where the storage device 100 is provably tamper resistant, the information may be used for accident investigation and insurance, etc.

Another instance of the embodiment is used to log seat belt usage. A functional device 120 such as a seat belt sensor is read (step 220) by the controller 130 and usage violations are written (step 240) to the storage device 100.

In another instance of the embodiment, the restriction data indicates that the driver is required to pass an acuity test. The controller 130 reads (step 220) a functional device 120 used for a non-trivial acuity test, such as a display and key pad requiring timed and/or rapid entering of a displayed message. An appropriate set of tests may be stored on the storage device (smart card) and a different set of tests may be presented each time the driver wants to operate the vehicle. In the case that the controller determines (step 230) that the driver has failed a test, such as the acuity test, the controller may prohibit operation of the vehicle by that user/operator.

Other user restriction and user logging data types not described here are also contemplated.

In another instance of the embodiment, the restriction data may indicate that the controller 130 should temporarily ignore a first unrestricted storage device 100, and only accept a second restricted storage device 100. An identical procedure may be used to add or remove logging requests. Therefore, only the method for adding restrictions need be described in detail herein.

A first unrestricted storage device 100 may be given the characteristic that it may be freely copied so that it can be replicated in case the original is lost or damaged. Methods for reading and writing a storage device 100 for replication are well known. This generally requires that the original first storage device 100 is not protected from unauthorized reading.

A second restricted storage device 100 may have most of the data freely readable, but a subset of the device may be made not readable. This could prevents usable copies of the card from being made.

Figure 3:
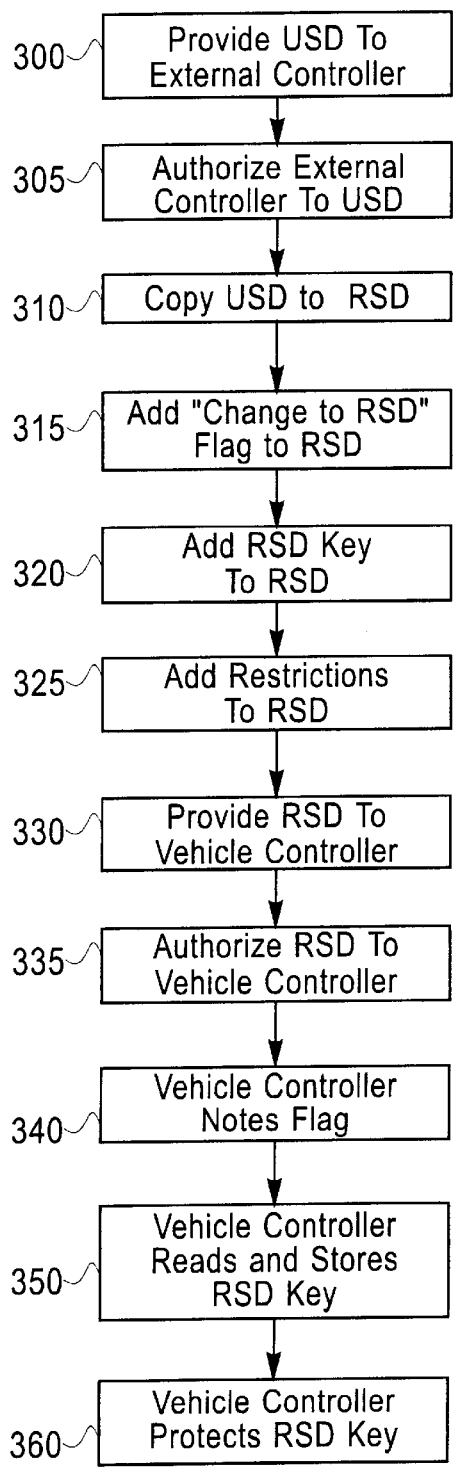
FIG. 3 is an exemplary embodiment of a method to add restrictions temporarily in accordance with the present invention.

FIG. 3 shows the steps of an exemplary method to add restrictions temporarily to an otherwise unrestricted storage device (USD).

In step 300, the unrestricted storage device is provided to an external controller. Controllers capable of reading and writing to a variety of storage devices are well known. This is so even when the storage device is a smart card.

In step 305, the external controller may be authorized to access all storage device data. The authorization method can be a password or personal identification number, etc. This authorization prevents illicit copying of the card, such copying being used for either theft or denial of service attacks. In step 310, the unrestricted storage device is read and copied to the restricted storage device. In step 315, a flag for the vehicle controller 130 saying "change to the restricted storage device" is added to the restricted storage device. The flag may also be protected by a password or personal identification number, etc.

In step 320, a restricted storage device key is added to the restricted storage device. This key is known to the restricting party, which may be an authority over the vehicle and/or vehicle operator. In the examples described previously, the authority is a rental car agency, a trucking company, a government agency such as a motor vehicle bureau, or the car owner passing a restricted storage device to a parking lot attendant, mechanic, or teen driver, etc. Usually, the key is not known to the operator ultimately receiving the storage device (smart card) with the restrictions.

In step 325, the prescribed and/or desired restrictions and/or logging requests are added to the restricted storage device. In step 330, the restricted storage device is provided to the internal vehicle controller 130. In step 335, the restricted storage device is validated (authorized) to the vehicle controller 130. Thus far, the restricted storage device may act as an unrestricted storage device.

In step 340, the vehicle controller 130 notes the flag. In step 350, the vehicle controller 130 reads and stores the restricted storage device key. If the key is the public part of an asymmetric key, this key may remain freely readable. If the key is a symmetric key, it must be protected from further reading in step 360 once stored in the vehicle controller 130.

The implementation of the steps in FIG. 3, generally causes the vehicle controller to respond only to the restricted storage device. In an alternate embodiment the vehicle controller responds to both restricted and unrestricted devices, but in differing ways.

Figure 4:
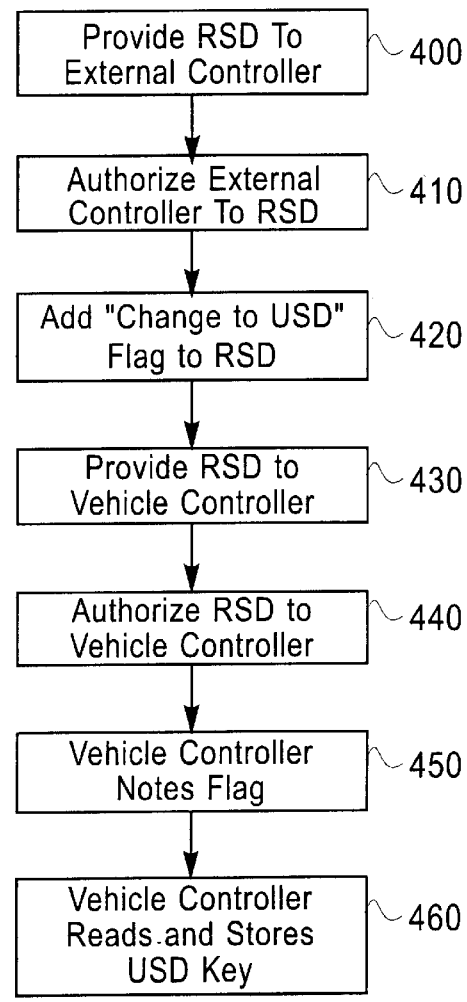
FIG. 4 is an exemplary embodiment of a method to remove the restriction added in the method of FIG. 3 in accordance with the present invention.

FIG. 4 shows the steps of an exemplary method to remove one or more restrictions from a storage device (e.g. a smart card). These steps may be used, for instance, to remove the restriction added in the method of FIG. 3. In step 400, the restricted storage device is provided to an external controller. In step 410, the external controller is authorized to have access to the storage device.

In step 420, a flag for the vehicle controller 130 indicating "change to a semi-restricted or to unrestricted storage device" is added to the restricted storage device after the storage device presents a password or personal identification number etc. In step 430, the restricted storage device is provided to the vehicle controller 130. In step 440, the restricted storage device is validated to the vehicle controller 130. In step 450, the vehicle controller 130 notes the flag added in step 420. In step 460, the vehicle controller 130 reads and restores the unrestricted or semi-restricted status of the storage device key.

Implementation of the steps in FIG. 4, enables the vehicle controller to now respond to the unrestricted or semi-restricted storage device. To implement this procedure, it is best that the storage device be provided with functionality such as password protected writes, authorizing to an external controller, authorizing an external controller, and protection from reads. A smart card is an example of a device upon which this functionality can be provided.

Figure 5:
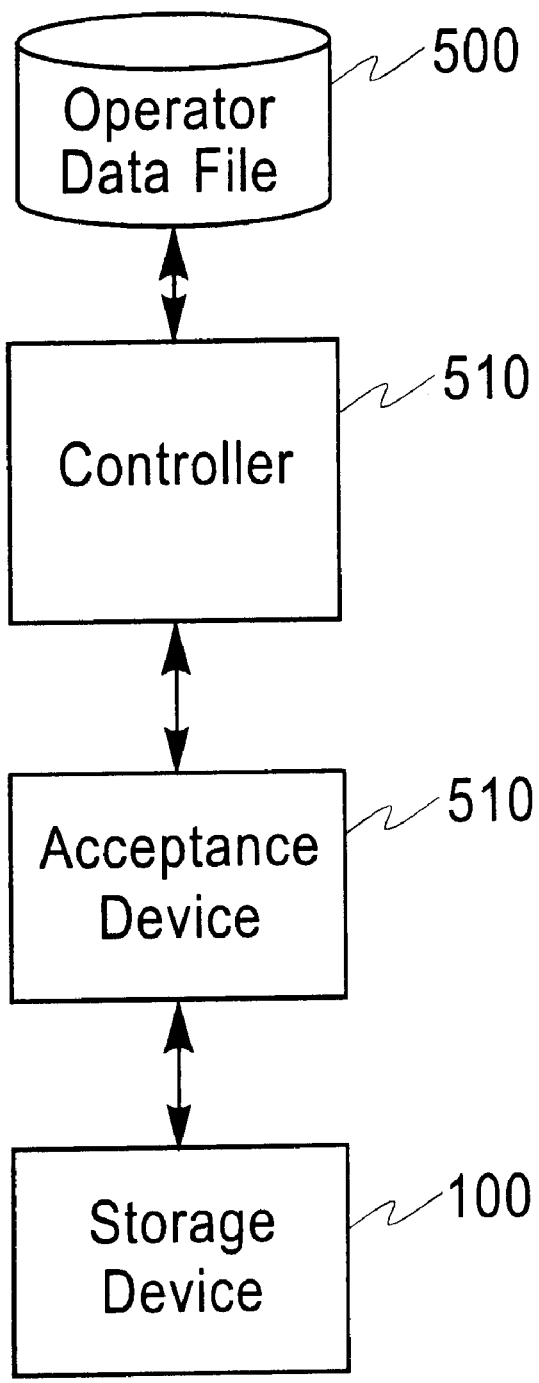
FIG. 5 is an exemplary apparatus for storing user customization, restriction, and logging request data on a storage device in accordance with the present invention.

FIG. 5 shows an exemplary apparatus for storing user customization, restriction, and logging request data on a storage device 100. It is assumed that vehicle operator specific data originates in a vehicle operator data file 500. In various embodiments this data file is owned by the operator, the owner of the vehicle such as a rental car company, or a third party.

In the example of a rental car company, the operator data file may provide the customer's basic profile of customizations, and may add additional data such as hotel, restaurant, and business locations use by a global positioning system. This information may be received from a travel agent. The file may also contain rental rates and origin of rental. This may be used for example for off line check in. For off line check in, the storage device may also be initialized to log mileage, final drop off location, and fuel gauge reading.

In an embodiment of this apparatus, the data from the data file may be read by the controller 510, routed to the acceptance device 510 attached to the controller 510, and from there loaded into the storage device 100.

Figure 6:
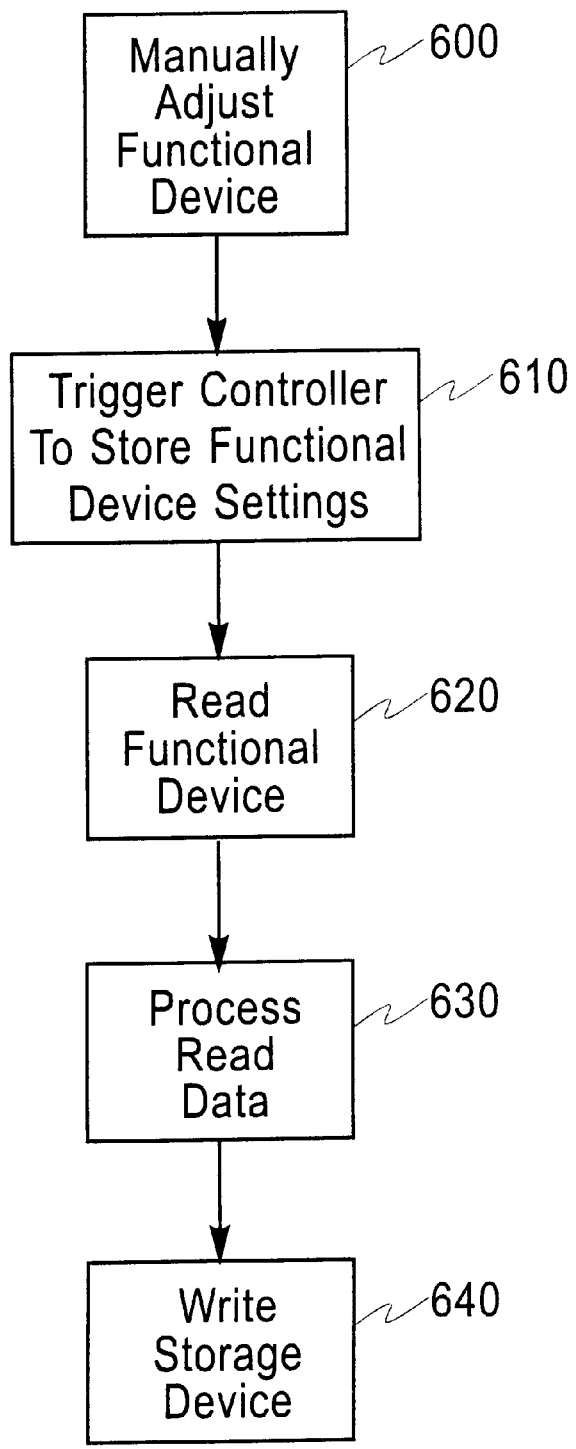
FIG. 6 is an alternate preferred method for storing user customization data on a storage device in accordance with the present invention.

The same apparatus of FIG. 5 can be used for backup storage of data from the storage device 100 written using the method of FIG. 6. FIG. 6 shows an alternate method and/or apparatus for storing user customization data on a storage device 100. In an embodiment using this apparatus, an operator manually adjusts 600 a plurality of functional devices 120 according to preferences. Once satisfied, the operator uses a functional device 120 such as a keypad to trigger 610 the controller 130 to read 620 from the functional devices 120, process 630 the read data, and write 640 the results of the processing to the storage device 100 through an acceptance device 110.

It is noted that this invention may be used for many applications and implemented in many formats and types of media. Although the description is made for particular arrangements and applications, the intent and concept of the invention is suitable and applicable to other arrangements and applications. For example, although the vehicle is described variously as a land vehicle, the basic invention and its concepts may similarly be implemented in sea, space and/or air vehicles or especially vehicle trainers, etc. It will be clear to those skilled in the art that other modifications to the disclosed embodiments can be effected without departing from the spirit and scope of the invention.

What is claimed is:

1. Apparatus for customizing the operation of a land automotive vehicle comprising:
   a) at least one entry device for entry of setting information for a plurality of functional devices of the vehicle wherein one of the functional devices is an airbag with an airbag personalization functional device for customized airbag deployment based on user physical characteristic setting information provided by the holders portable storage device;

b) a plurality of portable storage devices for entry by a holder into the entry device to provide setting information to the data entry device, said storage devices having different authority levels, with a first of the storage devices providing broad authority to the holder to provide setting information affecting all the plurality of functional devices and a second of the plurality of storage devices providing the holder of the storage device with limited authority to change a limited number of the settings and to operate the vehicle in accordance with rules restricting its use;

c) a global positioning system for indicating the position of the vehicle;

d) actuation devices for manual setting of the functional devices by the holder in accordance with the holders preferences and authority level;

e) a controller responsive to setting information provided by the entry device, position information provided by the global positioning system, information provided by the functional devices, and setting information provided by the actuation to devices to:

i) control the functional devices of the vehicle;
  ii) change the setting information in the holders portable storage device for later use by the holder in accordance with manual settings entered through one or more the actuation devices;
  iii) vary setting information in dependence upon the position of the vehicle;
  iv) provide data about the operation of the vehicle including vehicle operation outside the rules restricting the vehicles use including time and location restrictions imposed upon the storage device holder's use that are detected using the global positioning system; and
  v) provide vehicle status data including vehicle location upon detection of an accident by deployment of the airbag;

f) storage means for storing the data provided by the controller.

2. The apparatus of claim 1, wherein said vehicle is one of a truck or a car status data includes vehicle speed, throttle and brake status, headlight, wiper, and turn signal status and vehicle direction of travel data detected by the global positioning system.

3. The apparatus of claim 2 including means limiting access to status data and operational data to the holder of the first portable storage device.

4. The apparatus of claim 3, wherein said limited number of settings are comfort settings for the driver comprising seat, steering wheel and mirror setup settings.

5. The apparatus of claim 4, wherein said restrictions on use includes a time restriction limiting the time of use to a period of time.

6. The apparatus of claim 5, wherein said period of time is daylight hours as determined using the global positioning system.

7. The apparatus of claim 5 including a verification device for confirming the authority of the holder of one of the portable storage device to use the vehicle.

8. The apparatus of claim 5, wherein the restrictions on use include restrictions limiting vehicle use to specific geographical areas as determined by the global positioning system.

9. The apparatus of claim 5 including a radio with means responsive to the global positioning system to change radio stations based on the vehicles geographical area.

10. The apparatus of claim 1 including a destination customizing functional device means responsive to the global positioning system to customize a cruise control setting information and provide warnings based on speed limits in geographical locations of the vehicle as determined by the global positioning system.

11. The apparatus of claim 10 wherein said destination customizing functional device provides a warning and varies or disengages the cruise control system based on road conditions.

12. The apparatus of claim 1 including rental card company trip means for entering trip profile information received from a travel agent for use by the global positioning system and information including at least one of origination and drop off locations, rental rate, mileage and fuel gauge readings for off-line check in.

13. The apparatus of claim 1 wherein said airbag personalization functional device includes means requiring keyed in verification of the holder of the portable storage device before changing the airbag deployment profile.

* * * * *